United States Patent

[11] 3,629,690

| [72] | Inventor | Ernst Massar<br>Erlangen, Germany |
|---|---|---|
| [21] | Appl. No. | 47,222 |
| [22] | Filed | June 18, 1970 |
| [45] | Patented | Dec. 21, 1971 |
| [73] | Assignee | Siemens Aktiengesellschaft<br>Berlin and Munich, Germany |
| [32] | Priority | June 26, 1969 |
| [33] | | Germany |
| [31] | | P 19 32 379.6 |

[54] CURRENT LIMITING DEVICE FOR LIMITING SHORT-CIRCUIT CURRENT IN ENERGY TRANSFER SYSTEMS
2 Claims, 1 Drawing Fig.

[52] U.S. Cl. .................................................. 323/9,
307/306, 323/44 F
[51] Int. Cl. ...................................................... H01v 11/06
[50] Field of Search............................................ 317/123,
123 S; 307/306; 323/9, 44 F; 335/216; 336/58,
181, DIG. 1

[56] References Cited
UNITED STATES PATENTS

| 3,129,359 | 4/1964 | Kunzler.......................... | 335/216 X |
| 3,214,637 | 10/1965 | Persson ......................... | 323/44 F |
| 3,256,464 | 6/1966 | Stauffer......................... | 317/123 UX |
| 3,263,133 | 7/1966 | Stekly............................ | 317/123 |
| 3,414,777 | 12/1968 | Laquer et al................... | 317/123 |
| 3,443,255 | 5/1969 | Massar .......................... | 323/9 X |
| 3,486,079 | 12/1969 | Arp ............................... | 317/123 |

*Primary Examiner*—A. D. Pellinen
*Attorneys*—Curt M. Avery, Arthur E. Wilfond, Herbert L. Lerner and Daniel J. Tick

ABSTRACT: An electrically normal conducting impedance winding is connected in series with one of two inductively interlinked windings of a current limiting device and has an inductivity which is such that approximately the same electric voltage drop occurs at the impedance winding as does at the other of the windings when the current limiting device is operated at a current which is smaller than or equal to the limiting current. The series connection of the impedance winding and the one of the windings of the current limiting device is connected in parallel with the other of the windings of the current limiting device. The two windings, one of which is connected in series with the impedance winding and the other of which is connected in parallel with the series connection, have mutually opposed and substantially equal ampere turns. The one of the windings at least partially comprises superconducting material and has a critical field intensity which is exceeded when the limit value of the current is exceeded and the winding becomes electrically normal conducting.

PATENTED DEC 21 1971
3,629,690
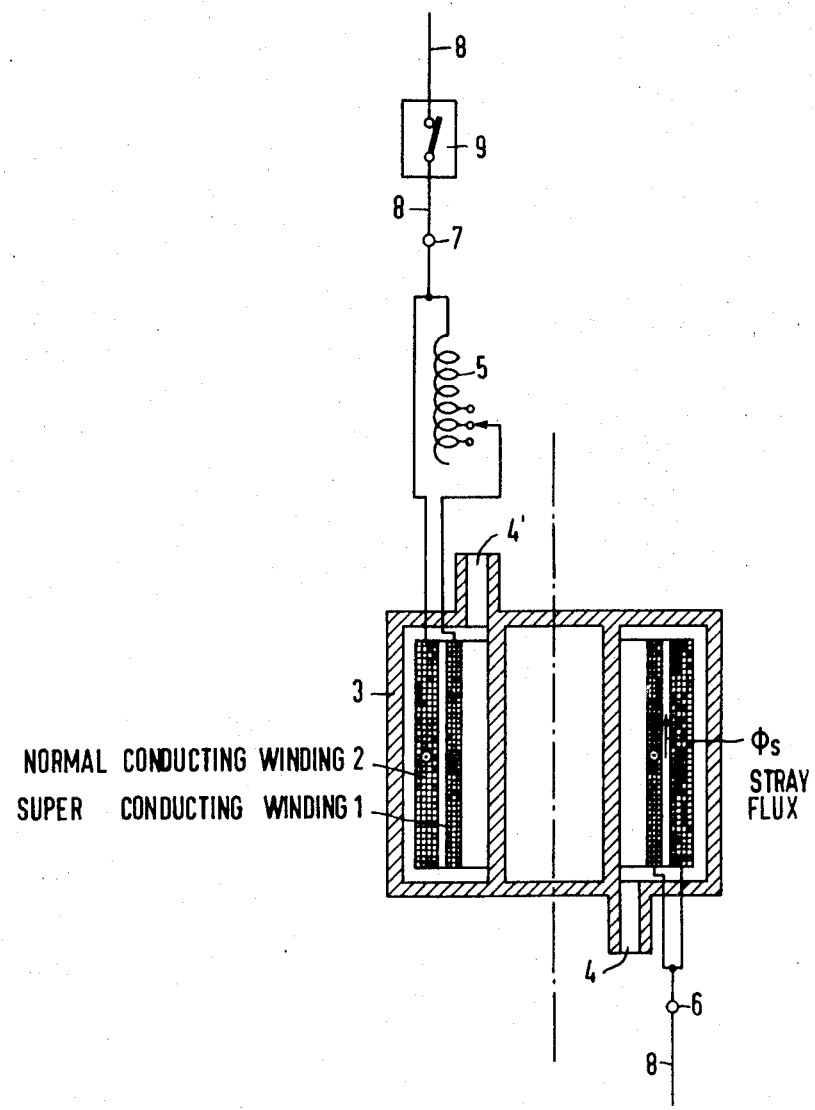
NORMAL CONDUCTING WINDING 2
SUPER CONDUCTING WINDING 1
Φs
STRAY FLUX

CURRENT LIMITING DEVICE FOR LIMITING SHORT-CIRCUIT CURRENT IN ENERGY TRANSFER SYSTEMS

DESCRIPTION OF THE INVENTION

The invention relates to a current limiting device. More particularly, the invention relates to a current limiting device for limiting short circuit current in energy transfer systems.

U.S. Pat. No. 3,443,255 relates to a current limiting device, preferably utilized for limiting short circuit current in energy transfer systems. The device of the patent comprises two parallel-connected and inductively interlinked windings with mutually opposed and substantially equal ampere turns. At least one of the two windings consists wholly or partially of a superconducting material and is designed and positioned so that its critical field or current intensity is exceeded when the critical or limiting value of current is exceeded, and the winding becomes normal conducting.

During the rated operation of the current limiting device, that is, during operation of the device with a current which is smaller than, or similar to, the critical or limiting current, the magnetic field of the second winding is almost completely compensated by the magnetic field of the first winding, which is in the opposite direction and has substantially the same magnitude. Only the stray field, which is the magnetic field located in the space between the windings, is effective. Consequently, the current limiting device has only a very small inductive resistance. When the presupposed limit value of the current is exceeded, the first winding is transformed from a superconducting condition to an electrically normal conducting condition, so that its ohmic resistance increases from zero value to very high values. This causes the current flowing through the first winding to decrease to such an extent that the opposing magnetic field, produced by such winding, substantially does not occur and the choke effect of the second winding becomes fully effective.

The principal object of the invention is to provide a new and improved current limiting device for limiting short circuit current in energy transfer systems.

An object of the invention is to provide a current limiting device which is an improvement over that described in U.S. Pat. No. 3,443,255.

An object of the invention is to provide a current limiting device for readily providing mutually opposed, similar ampere turns in both windings thereof during the entire rated operation.

An object of the invention is to provide a current limiting device for limiting short circuit current in energy transfer systems with facility, efficiency, effectiveness and reliability.

In accordance with the invention, an electrically normal conducting impedance winding is connected in series with the first winding and has a inductivity which is such that substantially the same voltage drop occurs at the impedance winding as at the second winding when the current limiting device is operated at a current smaller than or equal to the limiting current.

The impedance winding preferably has a variable inductivity. This permits the exact adjustment of the inductivity after the impedance winding has been connected to the two windings of the current limiting device.

In accordance with the invention, a current limiting device for limiting short circuit current in energy transfer systems includes two inductively interlinked windings with mutually opposed and substantially equal ampere turns. One of which windings at least partially comprises superconducting material and has a critical field intensity which is exceeded when the limit value of the current is exceeded and the winding becomes electrically normal conducting. The current limiting device comprises an electrically normal conducting impedance winding connected in series with the one of the windings and has inductivity which is such that approximately the same electric voltage drop occurs at the impedance winding as does at the other of the windings when the current limiting device is operated at a current which is smaller than or equal to the limiting current. The impedance winding has a variable inductivity, to enable adjustment thereof. The other of the windings is connected in parallel with the series connection of the impedance winding and the one of the windings.

In order that the invention may be readily carried into effect, it will now be described with reference to the accompanying drawing, wherein the single FIGURE is a schematic diagram, partly in section, of an embodiment of the current limiting device of the invention.

The current limiting device of the FIGURE comprises two windings 1 and 2 wound in opposite directions. The winding 1 comprises superconducting material and the winding 2 is electrically normal conducting. The winding 2 preferably comprises aluminum or copper having a high degree of purity and a corresponding low residual resistance.

The two windings 1 and 2 are positioned in a housing 3 comprising heat insulating material preferably comprising electrically nonconductive material such as, for example, a glass fiber-synthetic compound material. During the operation of the current limiting device, a coolant is circulated through the housing 3. The coolant may comprise, for example, liquid helium, which is supplied to the housing 3 and withdrawn from said housing via the tubular ducts 4 and 4' of said housing.

An electrically normal conducting impedance winding 5 having variable adjustable inductivity is connected in series with the superconducting winding 1. The impedance winding 5 may comprise, for example, a copper winding without an iron core and having a plurality of taps which may be scanned by a sliding contact or contacts. The normal conducting winding 2 is connected in parallel with the series connection of the superconducting winding 1 and the impedance winding 5.

The lead wires or electrical conductors of the windings 1 and 2 are electrically insulated in their areas at which they extend from the housing 3 and are provided with connecting terminals 6 and 7. The connecting terminals 6 and 7 permit the current limiting device to be plugged into an electric circuit 8 which is to be protected from short circuit current. A heavy-duty switch or circuit breaker 9 is also connected in the electric circuit 8.

The two windings 1 and 2 should be coupled as tightly as possible, so that the stray magnetic flux $0_s$, produced by the stray magnetic field between said windings, remains small. The variation of the stray fluxes alone causes a residual reactance which is effective in the electric circuit 8, because the interlinked flux of the two windings 1 and 2 substantially cancel each other in the space surrounded by the winding 1.

Due to the mutual cancellation of the magnetic fluxes in the space surrounded by the winding 1, during the rated operation of the current limiting device, the variation of the magnetic flux within said winding is zero, so that no electric voltage is induced in said winding. Thus, the current may increase to very high values in the superconducting winding 1. This results in the magnetic fluxes of the windings 1 and 2 no longer compensating each other.

In order to prevent the noncompensation of the magnetic fluxes of the windings 1 and 2, the normal conducting impedance winding 5 is, in accordance with the invention, connected in series with the superconducting winding 1. The inductivity of the impedance winding 5 is adjusted in a manner whereby, in the rated operation, the same voltage drop occurs at said impedance winding as it does at the normal conducting winding 2. Due to the stray flux $0_s$, a small magnitude of electric voltage is induced in the normal conducting winding 2.

In the rated operation, the voltage induced in the normal conducting winding 2 has a magnitude $$U^2 = 4.44 \, w \, f \, 0_s \, 10^{-8} \text{ volts}$$

wherein $w$ is the number of turns of the winding 2 and $f$ is the frequency of the current to be limited, in hertz. The impedance winding 5 permits the current necessary for the compensation of the magnetic fluxes of the windings 1 and 2 to occur in the superconducting winding 1. Since the inductivity of the impedance winding 5 is variable, the exact magnitude of said inductivity may be provided by adjustment after said impedance winding has been connected to the winding 1.

The loss of power in the impedance winding 5 is very small, since its inductivity is to be determined only for the small voltage drop which occurs as a result of the stray flux $\Phi_s$ in the winding 2, during the rated operation of the current limiting device. The current flowing through the impedance winding 5, and thus the loss of power in said impedance winding, may be further decreased if a larger number of turns is provided for the superconducting winding 1 than for the normal conducting winding 2.

By suitable selection of the material and dimensions of the wire thereof, the superconducting winding 1 is designed so that it is transformed from a superconducting condition to a normal conducting condition if the presupposed limit or critical value of the current is exceeded. This occurs, for example, at two or three times the rated current. If this condition arises, the superconducting winding 1 assumes a high ohmic resistance.

When the winding 1 assumes a high ohmic resistance, the current flows almost completely through the normal conducting winding 2, due to the current limiting device, so that current flow through the winding 1 considerably diminishes and the opposing field, produced by the winding 1, is eliminated. The inductivity of the normal conducting winding 2 may then develop to its full extent and may choke or impede the current flowing through the electric circuit 8.

After a release time or breaker operating time approximately 50 to 100 milliseconds, for example, the circuit breaker 9 may switch off, whereby, as a result of the current choking impedance, the breaking capacity of said circuit breaker is decreased to a fraction of the breaking capacity which would be required without the current choking impedance. Consequently, the circuit breaker 9 may be dimensioned for considerably smaller breaking capacities than would be possible without the current limiting device of the invention.

The normal conducting winding 2 may be cooled with another coolant, instead of liquid helium. Thus, for example, liquid nitrogen may be utilized to cool the normal conducting winding 2. In such case, the normal conducting winding 2 must be thermally insulated from the superconducting winding 1.

The normal conducting winding 2 may comprise superconducting material instead of electrically normal conducting material. In such case, however, care must be taken that the winding 2 does not become normal conducting when the winding 1 is transformed from a superconducting condition to a normal conducting condition. This may be accomplished by comprising a second winding of a superconducting material having a critical field intensity or current density which is greater than that of the superconducting material comprising the first winding. As a result, the second winding remains superconducting when the limit or critical value of the current is exceeded. It is also possible to provide the conductor dimensions of the second winding, of superconducting material, in a manner whereby the winding remains superconducting when the critical or limit value of the current is exceeded.

The two front parts of the superconducting winding 1, which are permeated by the outwardly bending magnetic field, may also comprise electrically normal conducting material, so that said winding may only partially comprise superconducting material.

The impedance winding 5 may be provided, for example, with a small slideable iron core, which permits a variation in its inductivity. However, the iron core must have such small dimensions that the behavior of the impedance winding 5 is determined by the air gap, which is large compared to the iron core.

The current limiting device may be utilized in a three-phase circuit. In such case, the current limiting device is preferably connected into each of the three branches of the three-phase system. A particular advantage of the current limiting device is that the energy transfer system protected thereby may be designed for considerably smaller short circuit currents than would be the case without such current limiting device. More particularly, the current limiting device is suitable for the protection of superconducting alternating current and three phase current cables which are supplied directly from generators, without the assistance of transformers.

While the invention has been described by means of a specific example and in a specific embodiment, I do not wish to be limited thereto, for obvious modifications will occur to those skilled in the art without departing from the spirit and scope of the invention.

I claim:

1. A current limiting device for limiting short circuit current in energy transfer systems, including two inductively interlinked windings with mutually opposed and substantially equal ampere turns, one of which windings at least partially comprising superconducting material and having a critical field intensity which is exceeded when the limit value of the current is exceeded and the winding becomes electrically normal conducting, said current limiting device comprising an electrically normal conducting impedance winding connected in series with said one of said windings and having an inductivity which is such that approximately the same electric voltage drop occurs at said impedance winding as does at the other of said windings when the current limiting device is operated at a current which is smaller than or equal to the limiting current, the other of the windings being connected in parallel with the series connection of the impedance winding and the one of the windings.

2. A current limiting device as claimed in claim 1, wherein said impedance winding has a variable inductivity, to enable adjustment thereof.

* * * * *